(12) United States Patent
Wickins

(10) Patent No.: US 6,210,580 B1
(45) Date of Patent: Apr. 3, 2001

(54) WASTE WATER TREATMENT APPARATUS

(75) Inventor: Jeremy Wickins, Sussex (GB)

(73) Assignee: Jeremy Wickens, Sussex (GB)

( * ) Notice: Subject to any disclaimer, the term of this patent is extended or adjusted under 35 U.S.C. 154(b) by 0 days.

(21) Appl. No.: 09/155,627

(22) PCT Filed: Mar. 13, 1997

(86) PCT No.: PCT/GB97/00722

§ 371 Date: Sep. 30, 1998

§ 102(e) Date: Sep. 30, 1998

(87) PCT Pub. No.: WO97/37940

PCT Pub. Date: Oct. 16, 1997

(30) Foreign Application Priority Data

Apr. 4, 1996 (GB) .................................. 9607160

(51) Int. Cl.$^7$ .................................................. C02F 3/00
(52) U.S. Cl. ....................... 210/614; 210/623; 210/221.2; 210/744
(58) Field of Search .................... 210/739, 744, 210/221.1, 221.2, 614, 623

(56) References Cited

U.S. PATENT DOCUMENTS

| 4,966,705 | * | 10/1990 | Jamieson | 210/605 |
| 5,076,928 | * | 12/1991 | Ballnus | 210/605 |
| 5,304,308 | * | 4/1994 | Tsumura | 210/746 |
| 5,626,754 | * | 5/1997 | Ballnus | 210/605 |
| 5,647,986 | * | 7/1997 | Nawathe | 210/608 |

* cited by examiner

Primary Examiner—Chester T. Barry
(74) Attorney, Agent, or Firm—Cook, Alex, McFarron, Manzo, Cummings, & Mehler, Ltd.

(57) ABSTRACT

Method and apparatus for waste water treating system including a working tank, waste water treatment apparatus in the working tank by which organic waste in the waste water is treated. A discharge outlet is provided from the working tank. A waste water holding tank is located upstream of the working tank. A first transfer pump between the working tank and the holding tank is provided to transfer waste water from the holding tank to the waste water tank. A second transfer pump is provided to discharge waste water from the working tank through a discharge outlet. A sensor is provided to sense the values of physical characteristics of the waste water in the tanks and to issue signals indicative of the different values. The time of operation of at least one of the transfer pumps by the control computer is varied in accordance with the value indicated by the signal issued from the sensor.

11 Claims, 1 Drawing Sheet

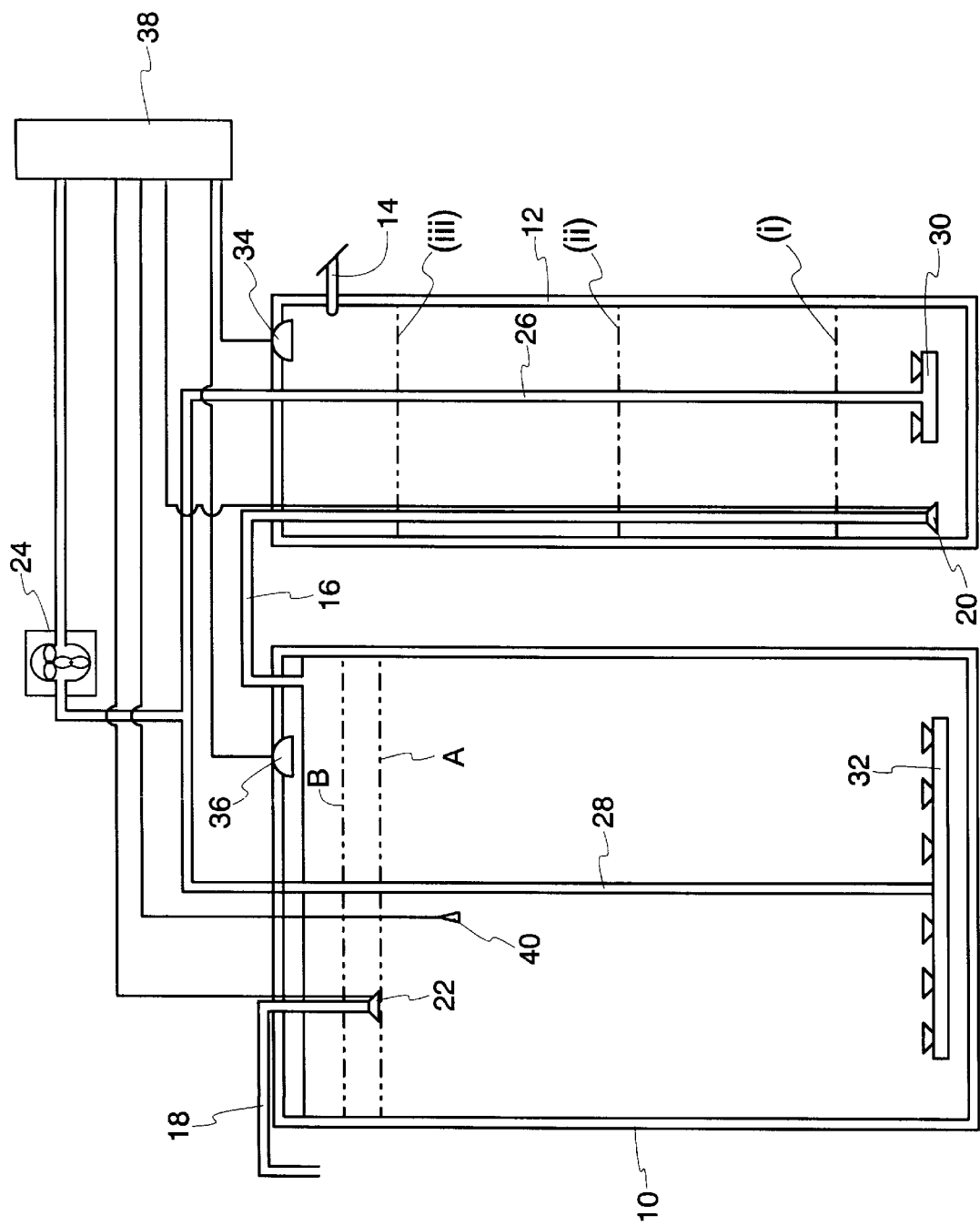

WASTE WATER TREATMENT APPARATUS

The present invention relates to waste water treatment apparatus comprising a working tank, waste water treatment means in the working tank by which organic waste in the waste water is treated, a discharge outlet from the working tank, a holding tank upstream of the working tank which serves to hold waste water, first transfer means between the working tank and the holding tank which serve to transfer waste water from the holding tank to the waste water tank, second transfer means which serve to discharge waste water from the working tank through the said discharge outlet, parameter level sensing means arranged to sense the value of a given parameter of the waste water in one or both of the tanks, and control means connected to one or both of the transfer means and the parameter level sensing means to operate the former in dependence upon a signal received from the latter.

Hitherto in such apparatus the parameter level sensing means has comprised a simple water level sensor in the holding tank which is capable merely of detecting whether or not the holding tank is full. Once it issues the holding tank full signal to the control means, the latter cause the transfer means to discharge waste water from the working tank and to transfer waste water from the holding tank to the working tank in accordance with a predetermined program.

A disadvantage of such a system is that it is unable to respond to a sizeable change in the rate of supply of waste water or biological loading to the holding tank, for example because of influx of rain water to the system during a period of very bad weather.

The present invention seeks to obviate this disadvantage, although it will be appreciated that the parameter concerned may instead be the amount of dissolved oxygen in the waste water, or the phosphorus content of the waste water, rather than the total amount of waste water being fed to the holding tank.

Accordingly, the present invention is directed to waste water treatment apparatus having the construction set out in the opening paragraph of the present specification, in which the parameter level sensing means are so constructed and arranged as to be capable of detecting at least two different non-zero values of the said parameter, and of issuing signals indicative of those two values, and in which the extent of operation of one or both transfer means by the said control means is dependent upon which of the two different values is indicated by the signal issued from the parameter level sensing means.

The said two values may be within an infinitely variable range of values, such that the said extent of operation varies in proportion to the value of the parameter.

Preferably, the said parameter is the depth of the waste water in the holding tank, but it may alternatively be the amount of dissolved oxygen in the waste water in the working tank, or it may be the phosphorus content of the waste water in the holding tank.

More than one sensor may be present to detect levels of more than one parameter of the waste water in one or both of the tanks, and the transfer means may be operated by the control means in dependence upon both or every one of the levels of those parameters.

If the said parameter is the depth of the waste water in the holding tank, it is desirable for the parameter level sensing means to comprise an ultra-sonic level detector in the holding tank. This may be positioned at or near the top of the holding tank, directed downwardly towards the surface of the waste water in the holding tank so as to receive a reflected ultra-sonic signal therefrom.

The waste water treatment means may comprise at least one aerator. An outlet of this may be located at or near the base of the working tank. It may be arranged to direct a stream of fine air bubbles upwardly into the waste water in the working tank.

Thus, it will be appreciated that apparatus in accordance with the present invention can react automatically to one or more parameters, so that it can be made to react to flow, strength and discharge quality.

The present invention extends to a method of treating waste water using apparatus made in accordance with the present invention.

Thus a second aspect of the present invention is directed to a method of treating waste water comprising feeding the waste water into a holding tank, transferring waste water from the holding tank to a working tank, treating the waste water in the working tank by waste water treatment means, and discharging the waste water from the working tank, the rate of discharge of waste water from the working tank and/or the rate of transfer of waste water from the holding tank to the working tank being dependent upon which of two non-zero values of the parameter of the waste water in one or both of the tanks is detected.

An example of waste water treatment apparatus embodying the present invention will now be described with reference to the accompanying drawing, the only FIGURE of which is a diagrammatic elevational view of the apparatus.

In the FIGURE, the apparatus shown comprises a working tank 10, a holding tank 12, an inlet 14 to the holding tank 12, and a transfer pipe 16 which extends from a position near the base of the interior of the holding tank 12 to the top of the interior of the working tank 10. The working tank is provided with a discharge outlet pipe 18 which extends from a position significantly lower than the top of the interior of the working tank 10 to a position which is exterior to the working tank 10.

At the foot of the transfer pipe 16 inside the holding tank 12 there is a loading pump 20. At the foot of the discharge outlet pipe 18 within the working tank 10 there is a discharge pump 22.

The illustrated apparatus is further provided with an air compressor 24 located outside the tanks. From this compressor 24 on the downstream side thereof and leading away therefrom are respective air supply tubes 26 and 28 leading respectively to matrices of membrane aerators 30 and 32 located respectively at the bases of the interiors of the holding tank 12 and the working tank 10.

Two ultra-sonic detectors 34 and 36 are provided respectively at the tops of the interiors of the holding tank 12 and the working tank 10. Each is directed downwardly to issue an ultra-sonic signal towards the surface of the water in its associated tank and to receive and detect the ultra-sonic signal reflected from the surface of the water in the associated tank and to issue a signal upon receipt thereof.

Both detectors are connected to an electronic micro-controller 38, which determines the water level in each tank by the time-delay between the issuing of an ultra-sonic signal it commands to be issued by each ultrasonic level detector means 34 and 36 and the time of receipt of the reflected signal.

The micro-controller 38 is also connected to control operation of the compressor 24, the loading pump 20 and the discharge pump 22.

A dissolved oxygen probe 40 is located in the interior of the working tank 10, below the level of the discharge pump 22, and is also connected electrically to the micro-controller 38 to provide a signal for receipt by the latter indicative of the dissolved oxygen content in the waste water contained in the working tank 10.

The apparatus operates as follows

The apparatus is installed for use as shown in the only FIGURE with the working tank 10 filled with water to the level A and a bio-sludge added which contains micro-organisms capable of treating sewage so as to render it a non-toxic waste. In the illustrated apparatus, the microorganisms used are ones which require a supply of air or oxygen to be effective.

With the apparatus connected to receive sewage and/or such waste water from a house or other building, such waste water is received by the apparatus at the inlet 14 so that the waste water starts to fill the holding tank 12.

The micro-controller 38 is programmed to operate a compressor 24 so that the latter feeds air to the aerators 30 and 32 at regular intervals for predetermined periods of time. The aerator 30 acts purely as a mixing device for the waste water in the holding tank 12, whereas the aerator 32 in the working tank 10 performs the additional function of supplying air to the micro-organisms contained in the waste water in the working tank 10.

At a fixed interval or window set prior to a discharge in accordance with the pre-programming of the micro-controller 38, the latter causes the ultra-sonic level detectors 34 and 36 to provide a reading of the water levels inside their associated tanks. These readings are taken after all aeration has ceased for a predetermined period to enable the waste water to settle.

If the level of the water in the holding tank 12 is below the level marked (i) in the FIGURE, then the micro-controller 38 operates the compressor 24 in sleep mode, and does not operate the loading pump 20 nor the discharge pump 22 at all. In sleep mode, the compressor 24 is operated to supply air to the aerators 30 and 32 for relatively brief periods at regular relatively long intervals.

If the ultra-sonic detector 34 indicates to the micro-controller 38 that the level of the water in the holding tank 12 has reached level (i), corresponding to a 20% fill, then the micro-controller 38 is switched out of sleep mode into a first pump-operating program. In this program, the discharge pump 22 is operated to provide one discharge in every twenty-four hour period. The compressor is operated for a six hour period for each discharge.

In the event that level (ii) (corresponding to a 60% fill) is detected in the holding tank 12, then a second pump-operating program is adopted by the micro-controller 38 in which the discharge pump 22 is set to operate once every twenty-four hours, to give one discharge for every twenty-four hours, but for a longer period so that the total discharge is greater than it is in the first program. The compressor 24 is operated for nine hours for each discharge.

If the water level in the holding tank 12 reaches level (iii) (corresponding to 80% fill) the micro-controller 38 switches to a third pump-operating program in which the discharge pump 22 is operated three times every twenty-four hour period, each discharge being of the same volume as in the first program, and the compressor 24 is operated for six hours for each stroke.

In every one of these programs, the load pump 20 is operated to maintain the level of water in the working tank 10 between levels A and B, corresponding to about 85% to 90% fill for the working tank.

In the event that the value of dissolved oxygen as indicated to the micro-controller 38 by the probe 40 is low, the micro-controller increases the period of aeration by the compressor 24. For example if that value falls below a predetermined threshold value, the aeration periods are doubled until such time as a further reading from the probe indicates an acceptable level of dissolved oxygen in the waste water.

It is possible for the micro-controller 38 to be off-site, perhaps many hundreds of miles away but linked by telephone line, for example. Preferably, however, the micro-controller 38 is on-site, but may be programmed or re-programmed from an off-site location by a telephone link, for example.

It will be seen that the illustrated apparatus provides the advantages including wet weather handling potential up to three times that of conventional apparatus, increasing the working potential of a working tank of given size, reducing energy consumption under widely varying hydraulic and biologically active loadings, and accurately controlling very high discharge standards independently of the loading functions.

The different pump-operating programs may have differing lengths of each pump operation, or different frequencies of operation, or both. Likewise for the different patterns of aeration.

Whilst specific threshold levels of water in the holding tank have been given herein, and whilst specific reaction patterns have been described, there may be an infinitely variable response in proportion to the degree to which the water level in the holding tank differs from the norm.

Instead of reacting to absolute levels of water in the holding tank, the apparatus may be constructed and programmed to react to changes from a pre-stored pattern of flow in the holding tank. The pre-stored pattern may be learnt by the micro-controller 38 over a given period of time.

In the event that the response of the apparatus to overloading is inadequate to enable an acceptable discharge, the operating pattern will give priority to an acceptable discharge over and above coping with the hydraulic volume, so as to be fail-safe. At the same time a warning signal may be issued by means not illustrated, possibly to an off-site location.

What is claimed is:

1. Waste water treatment apparatus comprising a working tank, waste water treatment means in said working tank by which organic waste in said waste water is treated, a discharge outlet from said working tank, a waste water holding tank upstream of said working tank, first transfer means between said working tank and said holding tank to transfer waste water from said holding tank to said waste water tank, second transfer means to discharge waste water from said working tank through said discharge outlet, sensing means arranged to sense the values of physical characteristics of said waste water in at least one of said tanks, and control means connected to at least one of said transfer means, said sensing means arranged to operate said transfer means in dependence on a signal received from said control means, said sensing means being capable of detecting at least two different values of said physical characteristics of said waste water and of issuing signals indicative of said two values, the time of operation of at least one of said transfer means by said control means is varied in accordance with the value indicated by said signal issued from said sensing means.

2. The waste water treatment apparatus of claim 1 in which said sensing means includes a plurality of sensors.

3. The waste water treatment apparatus of claim 1 in which said waste water treatment means includes at least one aerator.

4. The waste water treatment apparatus of claim 3 in which at least one aerator is located at or near the bottom of said working tank.

5. The waste water treatment apparatus of claim 3 in which said at least one aerator is arranged to direct a stream of fine air bubbles upwardly into said waste water in said working tank.

6. Waste water treatment apparatus according to claim 1 in which said value of said physical characteristics of said waste water in at least one of said tanks is the depth of the waste water in said holding tank.

7. The waste water treatment apparatus of claim 6 in which said sensor means is an ultra-sonic level detector in said holding tank.

8. The waste water treatment apparatus of claim 7 in which said ultra-sonic level detector is positioned at or near the top of said holding tank and is directed downwardly towards the surface of said waste water in said holding tank so as to receive a reflected ultrasonic signal therefrom.

9. The waste water treatment apparatus of claim 1 in which said value of said physical characteristics of said waste water in at least one of said tanks is the amount of dissolved oxygen in said waste water in said working tank.

10. The waste water treatment apparatus of claim 1 in which said value of said physical characteristics of said waste water in at least one of said tanks is the phosphoric content of said waste water in said holding tank.

11. A method of treating waste water comprising feeding said waste water into a holding tank, transferring said waste water from said holding tank to a working tank, treating said waste water in said working tank by waste water treating means, operating sensors capable of detecting at least two different values of physical characteristics of said waste water indicative of the condition or volume thereof in at least one of said holding and working tanks and discharging said waste water from said working tank, characterized in that the volume of discharge of said waste water from said working tank and the volume of transfer of said waste water from said holding tank to said working tank is dependent upon which of said values of said physical characteristics of said waste water in at least one of said tanks is detected said volume of discharge or transfer being varied in accordance with said value of said at least two different values of physical characteristics of said waste water indicated by said sensing means.

* * * * *